(12) United States Patent
Lin et al.

(10) Patent No.: US 8,988,051 B2
(45) Date of Patent: Mar. 24, 2015

(54) SYNCHRONOUS RECTIFYING BUCK-BOOST CONVERTER

(71) Applicant: Inno-Tech Co., Ltd., Taipei (TW)

(72) Inventors: Ching-Yuan Lin, Taipei (TW); Shu-Chia Lin, Taipei (TW); Wen-Yueh Hsieh, Taipei (TW); Yi-Pin Chen, Taipei (TW)

(73) Assignee: Inno-Tech Co., Ltd., Taipei (TW)

( * ) Notice: Subject to any disclaimer, the term of this patent is extended or adjusted under 35 U.S.C. 154(b) by 65 days.

(21) Appl. No.: 14/042,780

(22) Filed: Oct. 1, 2013

(65) Prior Publication Data

US 2014/0092641 A1    Apr. 3, 2014

(30) Foreign Application Priority Data

Oct. 3, 2012    (TW) .............................. 101136555 A

(51) Int. Cl.
*H02M 3/10* (2006.01)
*H02M 3/158* (2006.01)

(52) U.S. Cl.
CPC .............. *H02M 3/10* (2013.01); *H02M 3/1588* (2013.01)
USPC ......................................... 323/259; 323/282

(58) Field of Classification Search
CPC ..................... H02M 2001/0045; H02M 3/156; H02M 3/157; H02M 3/1582; H02M 3/1584; H02M 3/1588; G05F 1/24; G05F 1/56; G05F 1/575

USPC .......... 323/259, 268, 273, 282, 283, 344, 351
See application file for complete search history.

(56) References Cited

U.S. PATENT DOCUMENTS

| | | | | |
|---|---|---|---|---|
| 7,746,042 B2* | 6/2010 | Williams et al. | ............... | 323/223 |
| 7,746,043 B2* | 6/2010 | Melanson | ...................... | 323/224 |
| 7,936,160 B1* | 5/2011 | Sheehan | ........................ | 323/285 |
| 7,977,927 B2* | 7/2011 | Williams | ........................ | 323/266 |
| 7,990,120 B2* | 8/2011 | Leonard et al. | ................ | 323/282 |
| 8,552,703 B2* | 10/2013 | Liu et al. | ......................... | 323/283 |
| 8,593,125 B1* | 11/2013 | Xue | ............................... | 323/284 |
| 8,604,768 B2* | 12/2013 | Dowlatabadi | .................. | 323/284 |
| 8,692,532 B2* | 4/2014 | Lopata et al. | .................. | 323/284 |
| 8,773,084 B2* | 7/2014 | Casey et al. | .................... | 323/259 |
| 8,829,868 B2* | 9/2014 | Waltman et al. | ............... | 323/271 |

* cited by examiner

*Primary Examiner* — Adolf Berhane
(74) *Attorney, Agent, or Firm* — Lin & Associates IP, Inc.

(57) ABSTRACT

A synchronous rectifying buck-boost converter includes a controller, first and second transistors, an inductor and a capacitor. The controller is connected to the gates of the first and second transistors for controlling ON/OFF of the first and second transistors, and further controls the current of the inductor and charge/discharge of the capacitor. The first and second transistors connected in series are connected to the controller and the inductor. The inductor is connected to a first external power unit or a first external loading device. The drain of the first transistor is connected to a second external power unit or a second external loading device such that a low-voltage input power of the first external power unit is converted to a high-voltage output power or a high-voltage input power of the second external power unit is converted to a low-voltage output power.

7 Claims, 9 Drawing Sheets

SYNCHRONOUS RECTIFYING BUCK-BOOST CONVERTER

CROSS-REFERENCES TO RELATED APPLICATIONS

This application claims the priority of Taiwanese patent application No. 101136555, filed on Oct. 3, 2012, which is incorporated herewith by reference.

BACKGROUND OF THE INVENTION

1. Field of the Invention

The present invention relates generally to a buck-boost converter, and more particularly to a synchronous rectifying buck-boost converter, which utilizes a transistor with low resistivity rather than a diode for converting DC low voltage input power to DC high voltage output power and vice versa.

2. The Prior Arts

It requires different amount of DC current, such as 5V, 3V or much lower 1.8V, for operating a common electronic device or electrical product, An (Light Emitting Diode) LED device, consisting of LEDs connected in series or parallel, requires several two digit numbers of power source for illuminating the LEDs. In addition, a motor generally requires 12V power source for operating the same or even more DC for operating the same.

In the prior art technique, a synchronous rectifying technique is applied to a buck or boost circuit so as to convert an actual DC power source into a required amount of voltage power. In practical application, two diodes together with a capacitor and one or two inductors are implemented in order to control the conductivity of two diodes so as to charge/discharge the capacitor, thereby generating an output power source.

It is noted that the diodes of the conventional technique encounter a relatively high resistivity and if the same is applied to a conversion circuit in a high electrical field may result in high power loss. Under the trend of carbon reduction scheme, EC has recently declared restrictions the date beginning from which aged and large carbon-production electronic or electrical appliances are to be dumped out or discarded. Hence, it is highly desirable to develop a synchronous rectifying buck-boost converter for used in electronic or electrical appliances so that production of carbon is reduced, thereby satisfying the trend of carbon reduction.

SUMMARY OF THE INVENTION

The main object of the present invention is to provide a synchronous rectifying buck-booster converter that generally includes a controller, a first transistor, a second transistor, an inductor, a capacitor, a boost resistor and a buck resistor. The converter of the present invention possesses the synchronous buck-boost function in order to convert an actual DC power into high or low voltage power, wherein the source of the first transistor and the drain of the second transistor are interactively connected to each other and are further connected to the controller and one end of the inductor. The controller is connected electrically to the gates of the first and second transistors so as to control switch ON/OFF operation of the first and second transistors. The other end of the inductor is connected electrically to the buck resistor. The capacitor is connected electrically to a first external power unit/a second external loading device. The drain of the first transistor is electrically connected to the boost resistor and a first external loading device/a second external power unit. The boost resistor and the buck resistor are electrically connected the controller so as to form a feedback circuit.

The controller is adapted to control the switched ON/OFF of the first and second transistors, and further is adapted to convert a low voltage input power from the first external power unit into a high voltage output power which is supplied to the first external loading device via the gate of the first transistor. Alternatively, the controller is adapted to convert a high voltage input power from the second external power unit into a low voltage output power which is supplied to the second external loading device via the other end of the inductor.

The first and second transistors have a relatively low resistivity so that only a small amount of power is lost during the conversion. More particularly, the controller performs the required function via built-in firmware so that the synchronous rectifying boost-buck converter of the present invention can easily acquire or perform the desired applications via modification of the firmware.

BRIEF DESCRIPTION OF THE DRAWINGS

Aspects of the present disclosure are best understood from the following detailed description when read with the accompanying figures, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
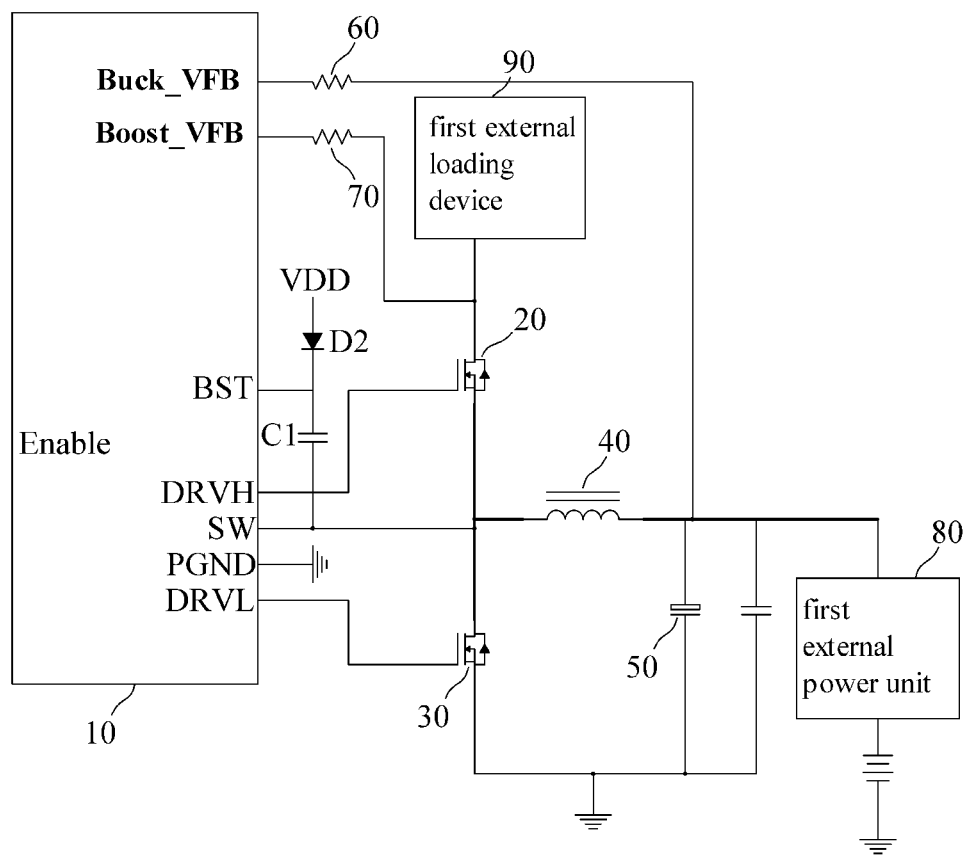
FIG. 1 illustrates the first embodiment of a synchronous rectifying buck-boost converter of the present invention in a voltage boost function.
Figure 2:
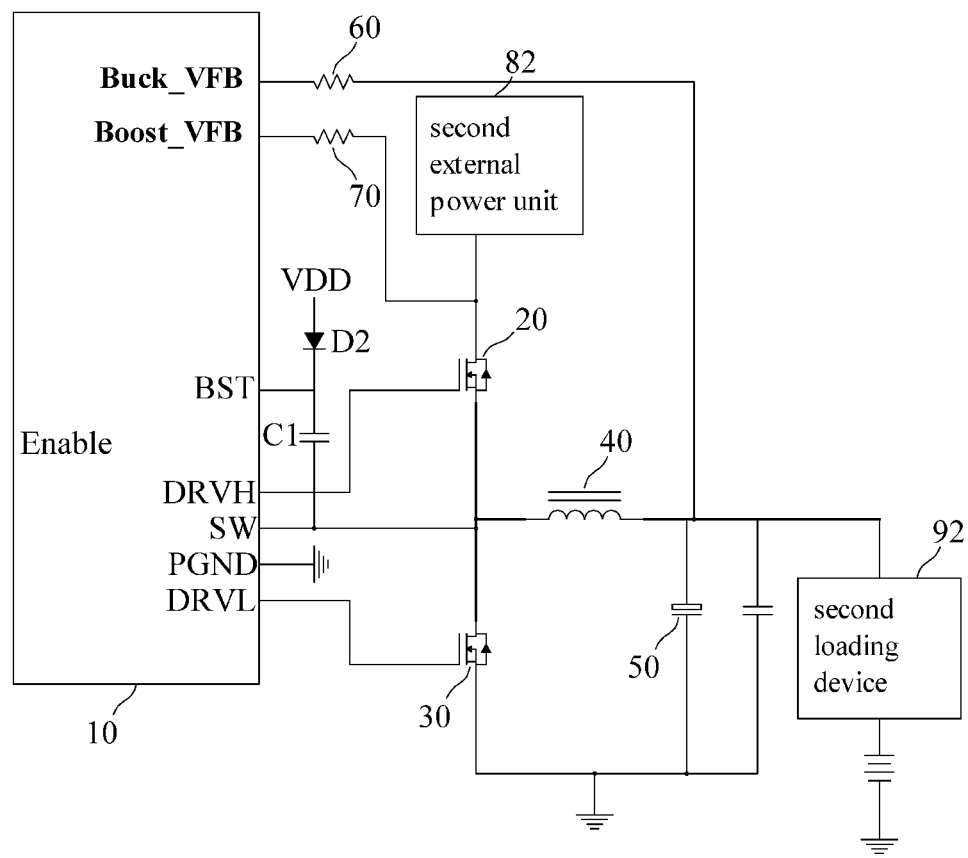
FIG. 2 illustrates the first embodiment of the synchronous rectifying buck-boost converter of the present invention in a voltage buck function.

Referring to FIGS. 1 and 2, wherein FIG. 1 illustrates the first embodiment of a synchronous rectifying buck-boost converter of the present invention in a voltage boost function and FIG. 2 illustrates the first embodiment of the synchronous rectifying buck-boost converter of the present invention in a voltage buck function. As best shown in FIG. 1, the synchronous rectifying buck-boost converter of the present invention includes a controller 10, a first transistor 20, a second transistor 30, an inductor 40, a capacitor 50, a buck resistor 60 and a boost resistor 70. The converter of the present invention possesses the synchronous buck-boost function in order to convert an actual DC power source into high or low voltage power source.

To be more specific, the controller 10 includes at least one input enabled end, a first drive end, a second drive end, a boost feedback end and a buck feedback end, wherein the input enable end is used for transmission of an enabled signal inputted from an external signal source, the first and second drive ends are electrically connected to the gates of the first and second transistors 20, 30 respectively, and the buck and boost feedback ends are respectively connected to one end of the buck resistor 60 and one end of the boost resistor 70. Note that the controller 10 performs a required function via a specific firmware or a microcontroller. Alternatively, the controller 10 utilizes a specific circuit directly in order to perform the required function.

The drain of the first transistor 20 is electrically connected to the other end of the boost resistor 70. The source of the first transistor 20 is electrically connected to the drain of the second transistor 30 and one end of the inductor 40 while the source of the second transistor 30 is grounded. Moreover, the other end of the inductor 40 is electrically connected to one end of the capacitor 50 and the other end of the buck resistor 60 while the other end of the capacitor 50 is grounded.

Additionally, the other end of inductor 40 is connected to a first external power unit 80 and the drain of the first transistor 20 is further connected to a first external loading device 90 such that a low-voltage input power of the first external power unit 80 is converted into a high-voltage output power and is supplied to the first external loading device 90, thereby providing the voltage boosting function. Alternatively, the other end of the inductor 40 is electrically connected to a second external loading device 92 and the drain of the first transistor 20 is further electrically connected to a second external power unit 82 such that a high-voltage input power of the second external power unit 82 is converted into a low-voltage output power and is supplied to the second external loading device 92, thereby providing the voltage bucking function. The first and second external power units 80, 82 are preferably DC (Direct Current) source, such as first and second batteries or solar cells.

Figure 3:
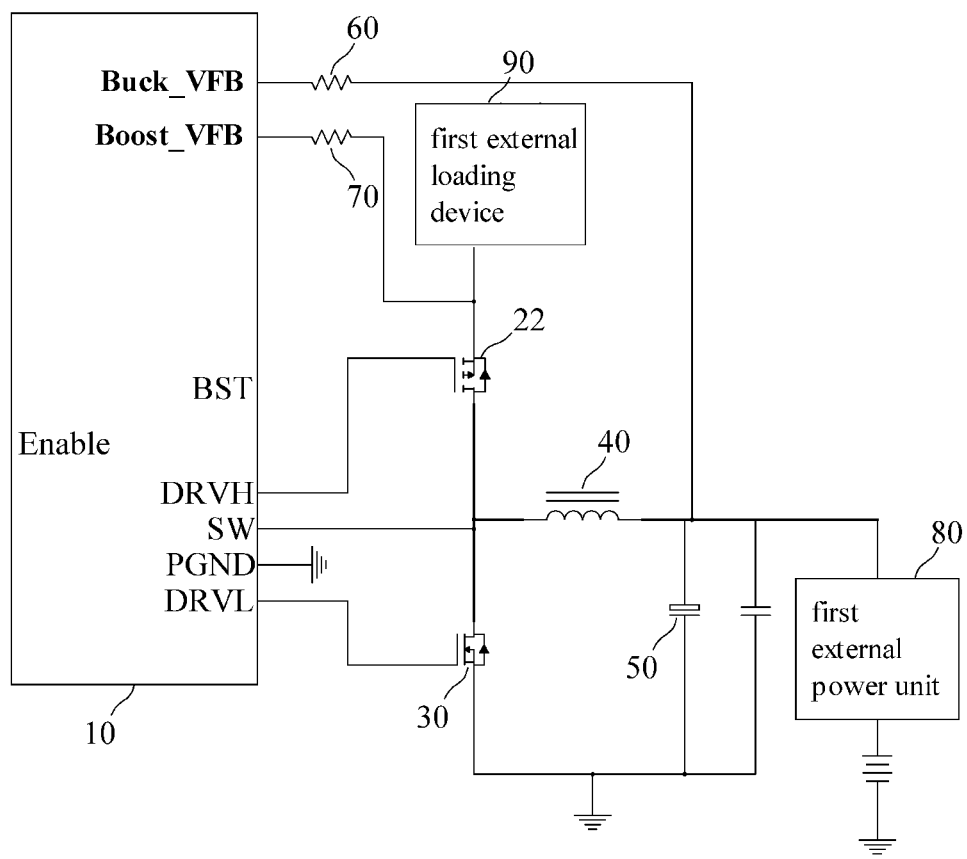
FIG. 3 illustrates the second embodiment of the synchronous rectifying buck-boost converter of the present invention in a voltage boost function.
Figure 4:
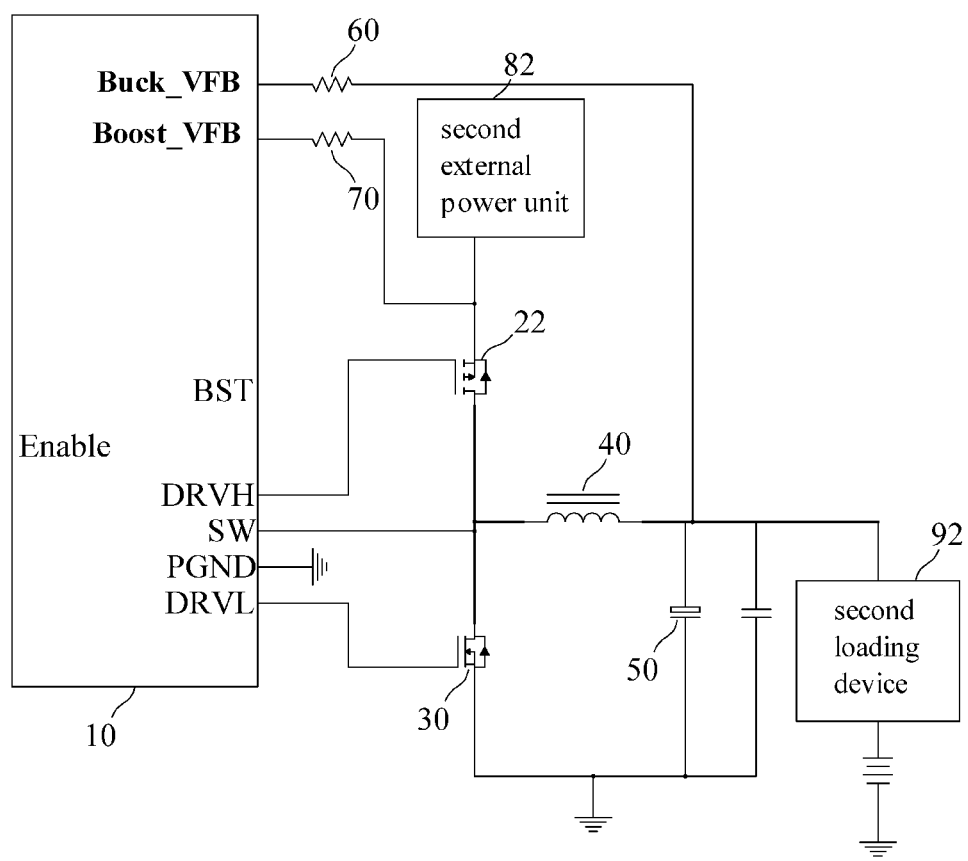
FIG. 4 illustrates the second embodiment of the synchronous rectifying buck-boost converter of the present invention in a voltage buck function.

Referring to FIGS. 3 and 4, wherein FIG. 3 illustrates the second embodiment of the synchronous rectifying buck-boost converter of the present invention in a voltage boost function while FIG. 4 illustrates the second embodiment of the synchronous rectifying buck-boost converter of the present invention in a voltage buck function. The second embodiment has the similar structure to the first embodiment, except in that the first and second transistors 20, 30 employed in the first embodiment are N-type while P-type transistor servers as the first transistor 20 and N-type transistor serves as the second transistor 30 in the second embodiment. Preferably, the N-type transistor includes NMOS (Negative Metal Oxide Semiconductor) while the P-type transistor includes PMOS (Positive Metal Oxide Semiconductor), therefore, the structure and characteristics of the other elements are not repeated herein.

Figure 5:
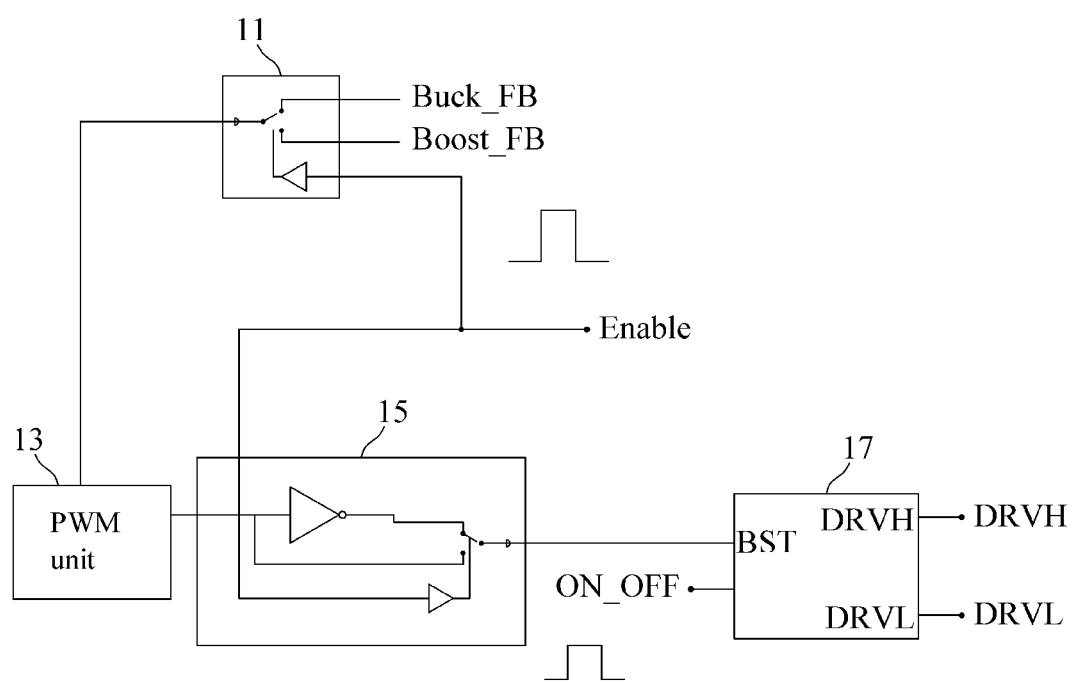
FIG. 5 shows a functional block of a controller implemented in the synchronous rectifying buck-boost converter of the present invention.

The operation of the controller 10 is explained in the form of the hardware circuit in the following:

FIG. 5 shows a functional block of the controller implemented in the synchronous rectifying buck-boost converter of the present invention. As illustrated, the controller 10 includes a selection unit 11, a PWM (Pulse Width Modulation) unit 13, a driver control unit 15 and a driver unit 17. The selection unit 11 is electrically connected to the input enabled end, a boost feedback end and a buck feedback end so that when the enable signal is at the high level, the feedback signal from the boost resistor 70 and the buck resistor 60 is transmitted to the PWM unit 13 via the boost feedback end and the buck feedback end, where the PWM unit 13 generates a specific PWM signal based on the received feedback signal such the width of the specific PWM signal is modulated appropriately in accordance with the feedback signal.

The driver control unit 15 later receives the PWM signal and utilizes a Schmitt Trigger circuit or a filter circuit to filter out the undesired noise or conduct a glitch operation when the enabled signal is at the pitch level so as to generate and transmit a drive control signal to the driver unit 17. Finally, the driver unit 17 cooperating with the drive control signal generates ON/OFF signal for switching the first and second transistors 20, 30 ON/OFF based on the PWM signal. Additionally, the ON/OFF signal is generated internally or inputted externally.

Note that the operation of the above mentioned selection unit 11, the PWM unit 13, the driver control unit 15 and the driver unit 17 is accomplished via a firmware.

Figure 6:
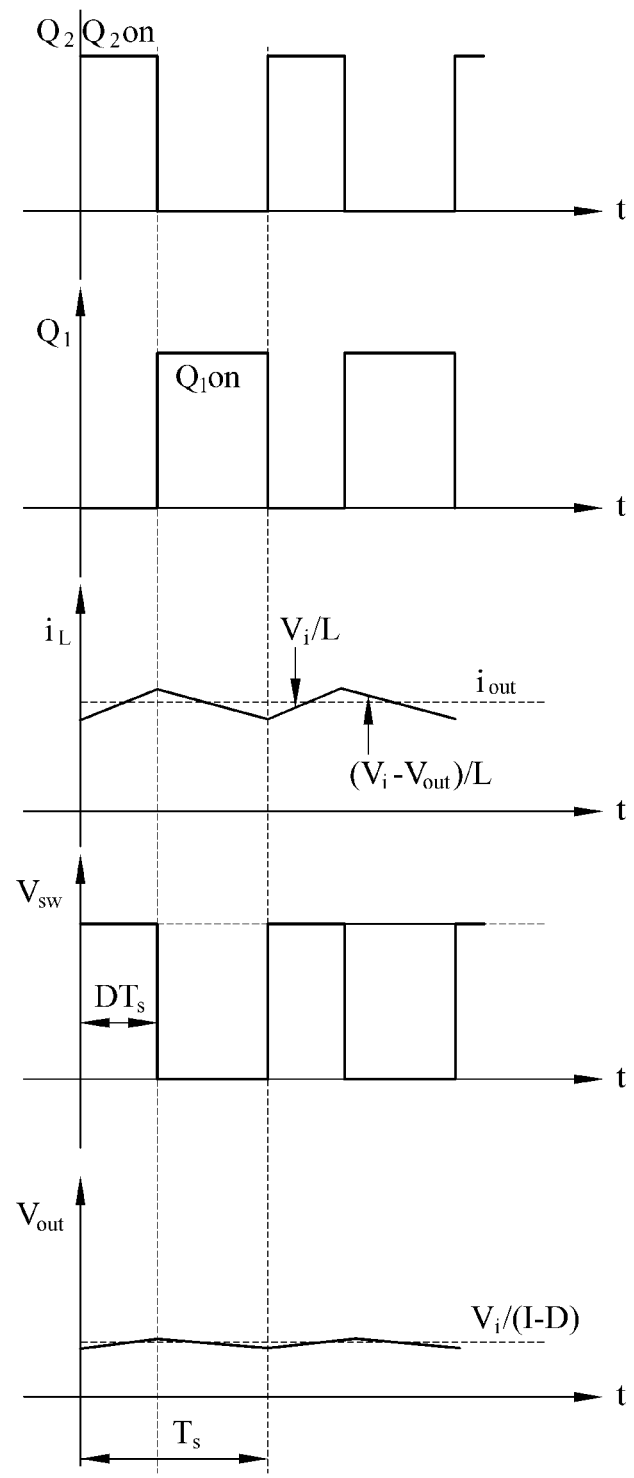
FIG. 6 shows the waveform of the synchronous rectifying buck-boost converter of the present invention in the voltage boost function.
Figure 7:
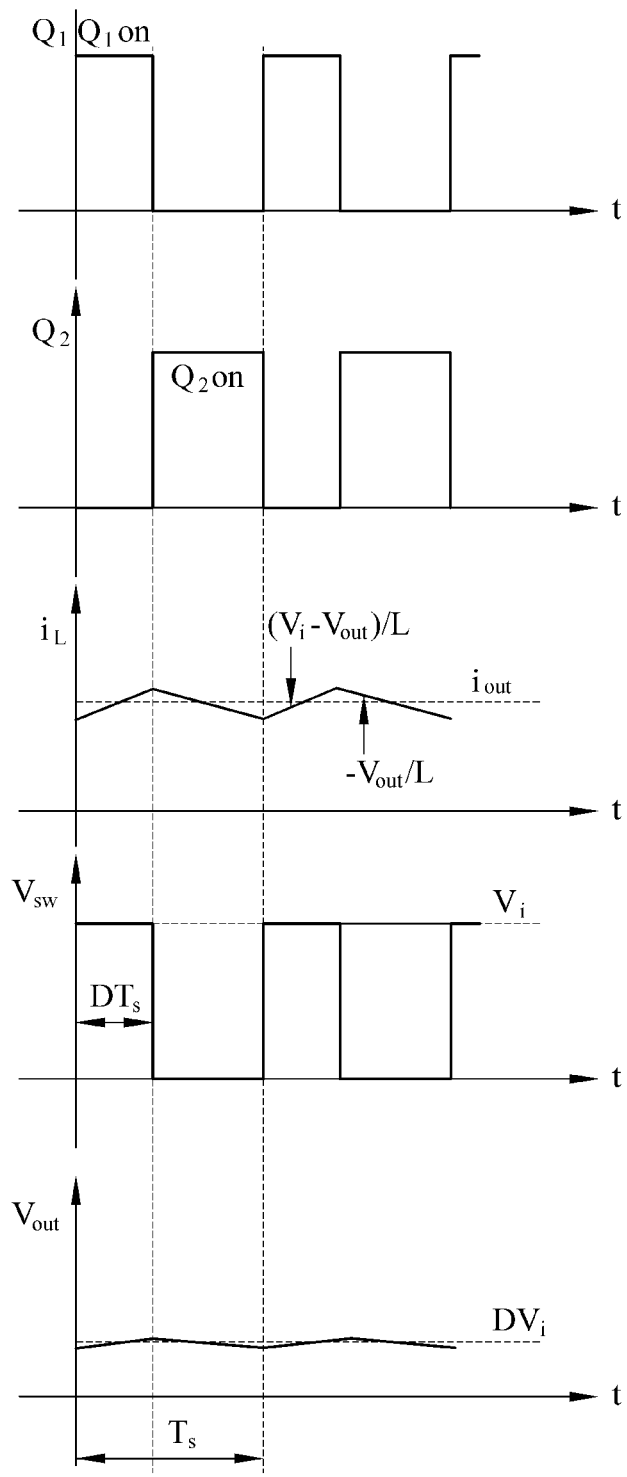
FIG. 7 shows the waveform of the synchronous rectifying buck-boost converter of the present invention in the voltage buck function.
Figure 8:
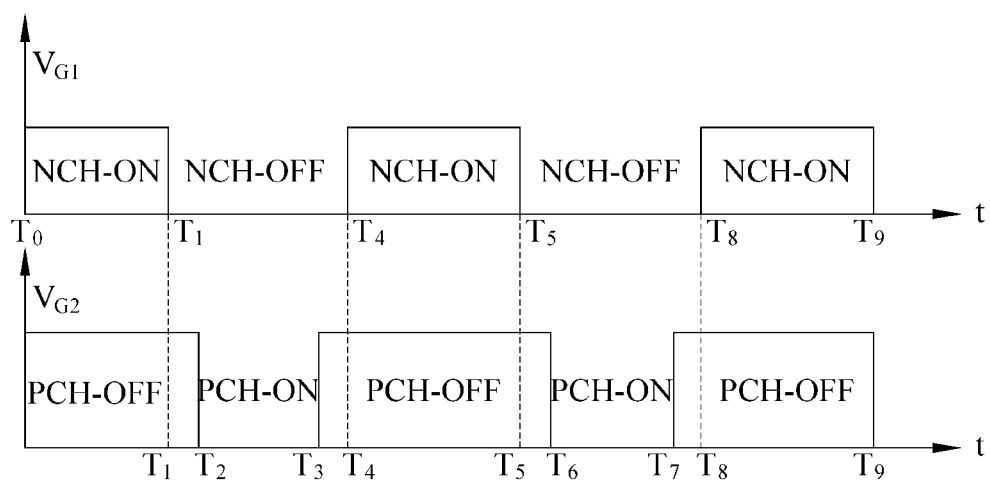
FIG. 8 shows the waveform of a gate of a transistor implemented in the first embodiment of the synchronous rectifying buck-boost converter of the present invention.
Figure 9:
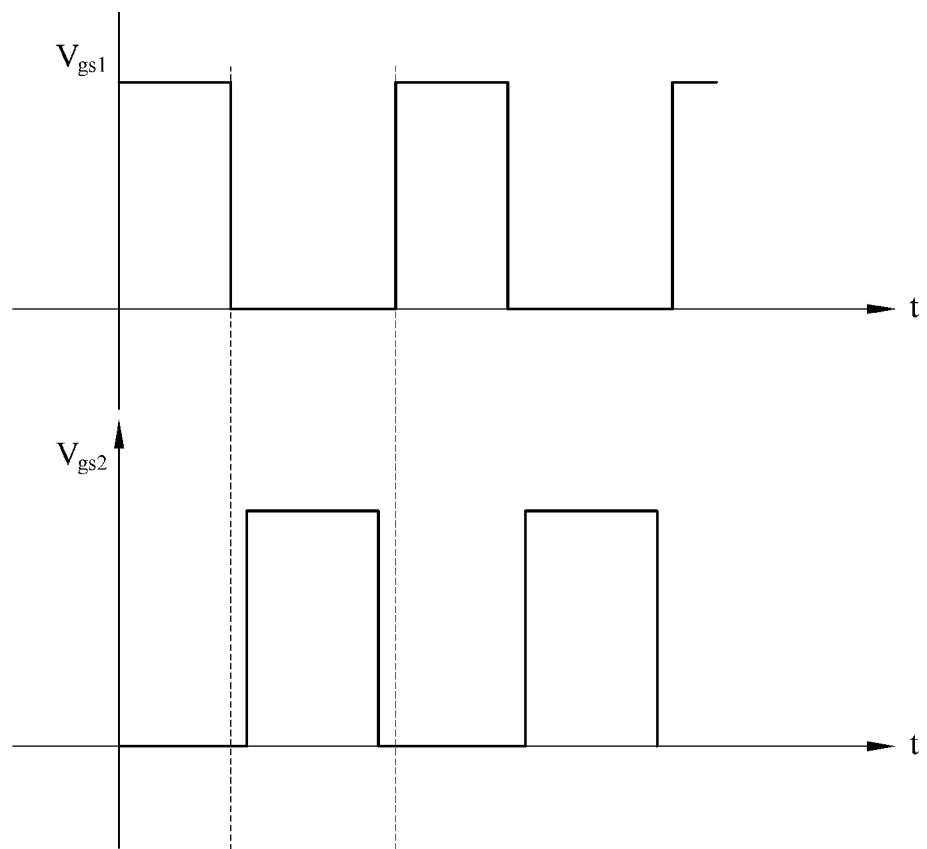
FIG. 9 shows the waveform of a gate of a transistor implemented in the second embodiment of the synchronous rectifying buck-boost converter of the present invention.

Referring to FIGS. 6 to 9, wherein FIG. 6 shows the waveform of the synchronous rectifying buck-boost converter of the present invention in the voltage boost function; FIG. 7 shows the waveform of the synchronous rectifying buck-boost converter of the present invention in the voltage buck function; FIG. 8 shows the waveform of a gate of a transistor implemented in the first embodiment of the synchronous rectifying buck-boost converter of the present invention; and FIG. 9 shows the waveform of a gate of a transistor implemented in the second embodiment of the synchronous rectifying buck-boost converter of the present invention.

As shown in FIG. 6, during the voltage boost operation of the converter of the present invention implementing FIGS. 1 and 3, the switch-on interval (Q1 on) of the first transistors 20 and the switch-on interval (Q2 on) of the second transistors 30 staggers (does not overlap) with each other under the PWM control so that the input voltage Vi from the first external power unit is boosted via the performance of the flow current iL through the inductor 40 and the capacitor 50. Therefore, the average voltage (Vi/(1−D)) of the output voltage from the first external loading device 90 is greater than the input voltage, thereby providing the voltage boost function, where D is smaller than 1, that is the average voltage is a ratio of the switch-on interval of the first transistor and the PWM switching cycle Ts.

Similarly, as shown in FIG. 7, during the voltage buck operation of the converter of the present invention implementing FIGS. 2 and 4, under the PWM control, the switch-on intervals (Q1 on) of the first transistors 20 and switch-on intervals (Q2 on) of second transistors 30 allow the input voltage Vi from the second external power unit 82 to be bucked via the performance of the flow current iL through the inductor 40 and the capacitor 50. Therefore, the average voltage (DVi) of the output voltage from the second loading device 92 is reduced, thereby providing the voltage buck function.

Additionally, FIG. 8 shows the waveform of the gate (VG1 or Vgs1) of first and second transistors 20, 30 implemented in the first embodiment of the synchronous rectifying buck-boost converter of the present invention; and FIG. 9 shows the waveform of a gate (VG2 or Vgs2) of the first and second transistors 20, 30 implemented in the second embodiment of the synchronous rectifying buck-boost converter of the present invention, wherein the first and second transistors 20, 30 are NMOS (Negative Metal Oxide Semiconductor) or the first transistor 20 is PMOS (Positive Metal Oxide Semiconductor). In FIG. 8, NCH-ON illustrates NMOS is switched ON, NCH-OFF illustrates NMOS is switched OFF, PCH-ON illustrates PMOS is switched ON and PCH-OFF illustrates PMOS is switched OFF.

One specific feature of the present invention is that a single inductor is employed to complement with 2 N-type transistors and under the control of the controller to synchronously rectifying boost-buck functions. More particularly, N-type and P-type transistors can be employed simultaneously so as to achieve the boost-buck function, thereby simplifying the circuit structure and providing stable manipulation thereof.

Another specific feature of the present invention is the controller is operated digitally so as to reduce the system noise or the external noise, thereby lowering the interference. The operation of the controller is performed via the firmware so that modification of the firmware enables variation in the operation modes, thereby providing a wider use range of the buck-boost converter of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A synchronous rectifying buck-boost converter, comprising:
    a controller, a first transistor, a second transistor, an inductor, a capacitor, a boost resistor and a buck resistor; and, wherein, the controller has an input enabled end, a first driving end, a second driving end, a boost feedback end, a buck feedback end, the input enabled end is used for transmitting an enable signal inputted from an external signal source, the first and second driving ends respectively and electrically connected to the gates of the first and second transistors, the boost and buck feedback ends respectively and electrically connected to one end of the boost transistor and one end of the buck transistor, the drain of the first transistor connected electrically to the other end of the boost transistor, the source of the first transistor connected electrically to the drain of the second transistor and one end of the inductor, the source of the second transistor being intended for grounding, the other end of the inductor connected electrically to the other end of the buck resistor and one end of the capacitor, the other end of the inductor connected electrically to the other end of the boost resistor and the other end of the capacitor, the other end of the capacitor being intended for grounding, the drain of the first transistor further connected electrically a first external loading device, the other end of the inductor further connected electrically to a first external power unit source so that a low voltage input power from the first external power unit is converted into a high voltage output power and is inputted to the first external loading device or the drain of the first transistor further connected electrically to a second external power source and the other end of the inductor further connected electrically to a second external loading device so that the high voltage input power supplied from the second external power unit is converted into the low voltage output power for inputting into the second external loading device.

2. The synchronous rectifying buck-boost converter according to claim 1, wherein the controller includes a selection unit, a PWM (Pulse-Width Modulation) unit, a drive control unit and a drive unit, the selection unit being connected electrically to the input enabled end, the boost feedback end and the buck feedback end so that when the enabled signal reaches a peak level, a feedback signal inputted from the boost and buck feedback ends of the boost and buck resistors is transmitted to the pulse-width modulation unit, which generates a PWM control signal based on the feedback signal, where the drive control unit prosecutes the PWM control signal upon receipt thereof utilizing a Schmitt Trigger circuit or a filter circuit and transmitting a drive control signal to the drive unit, which converts the drive control signal in corporation with an On/Off switch signal, thereby generating a corresponding PWM control signal for driving the first and second transistors, the On/Off switch signal being generated from an interior or an exterior.

3. The synchronous rectifying buck-boost converter according to claim 2, wherein each of the selection unit, the PWM (Pulse-Width Modulation) unit, the drive control unit and the drive unit is implemented via a hardware circuit.

4. The synchronous rectifying buck-boost converter according to claim 2, wherein the controller is a microcontroller while each of the selection unit, the PWM (Pulse-Width Modulation) unit, the drive control unit and the drive unit is implemented via a firmware.

5. The synchronous rectifying buck-boost converter according to claim 1, wherein the first and second external power units are DC (Direct Current) source, which includes a first and second batteries or solar cells.

6. The synchronous rectifying buck-boost converter according to claim 1, wherein N-type transistor serves for the first and second transistors and includes NMOD (Negative Metal Oxide Semiconductor).

7. The synchronous rectifying buck-boost converter according to claim 1, wherein N-type transistor serves for the first transistor and P-type transistor serves for the second transistor, the N-type transistor includes NMOD (Negative Metal Oxide Semiconductor) and the P-type transistor includes PMOS (Positive Metal Oxide Semiconductor).

* * * * *